United States Patent
Galan

(10) Patent No.: US 7,228,119 B2
(45) Date of Patent: Jun. 5, 2007

(54) APPARATUS AND METHOD FOR A RADIO FREQUENCY (RF) RECEIVER FRONT END PRE-SELECTOR TUNING FOR IMPROVING THE REDUCTION IN INTERMODULATION DISTORTION (IMD)

(75) Inventor: Ariel L. Galan, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 458 days.

(21) Appl. No.: 10/331,220

(22) Filed: Dec. 30, 2002

(65) Prior Publication Data

US 2004/0127181 A1    Jul. 1, 2004

(51) Int. Cl.
    *H04B 7/00*    (2006.01)
(52) U.S. Cl. .................. 455/260; 455/315; 455/339
(58) Field of Classification Search ............. 455/296, 455/315, 316, 341, 313, 314, 230, 255–260, 455/337–339, 340
    See application file for complete search history.

(56) References Cited

U.S. PATENT DOCUMENTS

| | | | | |
|---|---|---|---|---|
| 3,716,730 A | * | 2/1973 | Cerny, Jr. ................. 327/113 |
| 5,301,358 A | * | 4/1994 | Gaskill et al. ........... 455/193.2 |
| 5,752,179 A | * | 5/1998 | Dobrovolny ................ 455/266 |
| 6,072,999 A | * | 6/2000 | Konishi et al. ............. 455/286 |
| 6,177,964 B1 | * | 1/2001 | Birleson et al. ............ 348/725 |
| 6,345,173 B1 | * | 2/2002 | Fourtet et al. ................ 455/76 |
| 6,784,945 B2 | * | 8/2004 | Norsworthy et al. ......... 348/731 |
| 6,917,328 B2 | * | 7/2005 | Rabinowitz et al. ... 342/357.06 |
| 2003/0050018 A1 | * | 3/2003 | Weissman et al. ............ 455/82 |
| 2003/0206070 A1 | * | 11/2003 | Pietruszynski et al. ..... 331/158 |
| 2003/0210110 A1 | * | 11/2003 | Perreault et al. ............ 333/177 |

* cited by examiner

*Primary Examiner*—Edward F. Urban
*Assistant Examiner*—Nhan T. Le
(74) *Attorney, Agent, or Firm*—Barbara R. Doutre

(57) ABSTRACT

A system and method of improving the rejection of intermodulation (IM) distortion in receivers (100) employing varactor tuning preselecters by exploiting the attenuating properties of a tunable preselecter at specific voltages. The invention takes advantage of a first preselecter (101) and a second preselecter (105) already present in existing receiver circuits enabling them to provide attenuation to incoming radio frequency (RF) signals. This enables the receiver to better operate without the burden of interference and without the need to retrofit the receiver with added attenuator circuitry.

10 Claims, 1 Drawing Sheet

APPARATUS AND METHOD FOR A RADIO FREQUENCY (RF) RECEIVER FRONT END PRE-SELECTOR TUNING FOR IMPROVING THE REDUCTION IN INTERMODULATION DISTORTION (IMD)

TECHNICAL FIELD

This invention relates in general to two-way communications systems and more particularly to interference reduction through the use of attenuation in a two-way radio receiver.

BACKGROUND

Two-way radios are typically designed with a robust amount of gain in their amplifier stages. As is well known in the art, one drawback of providing too much gain occurs when multiple communication systems are operated in close proximity to one another. The radio frequency (RF) gain stages of the radio receiver can both provide gain but can also work to enhance interference. Generally, the cause of this problem stems from intermodulation distortion (IM) and adjacent channel interference which degrade radio performance in the form of poor radio reception. Intermodulation distortion interference occurs from adjacent channel interference then mixes with other RF signals to produce an unwanted RF signal on or near the desired frequency of operation. This type of interference is becoming very common as radio spectrum becomes more crowded with differing types of users, RF signal power levels and modulation schemes all attempting to fit into a finite space.

In the past, one common way to help the receiver reduce this type of interference has been through the use of an attenuator. The attenuator is a circuit that may be inserted between the antenna of the radio receiver and the RF amplifier circuitry in order to reduce the amount of RF energy reaching the receiver. This RF energy takes the form of on-channel signals as well as off-channel interference appearing on the desired frequency to interference with the desired on-channel signals. As a general rule since the intermodulation product is a third order non-linear expression, every one decibel (dB) of attenuation that is switched in circuit provides a three dB reduction in the amount of intermodulation interference in the radio receiver.

One problem associated with this type of approach is that not all transceivers have an integrated attenuator for use with the receiver. Any external attenuation would not only be inconvenient to use but also would add extra weight and expense to the operation of the device. Accordingly, the need exists to provide a system and method that would enable existing circuitry used within a radio transceiver to act as an attenuator when needed. This would work to ultimately optimize the performance of the radio receiver by enabling the user to accurately receive various signal levels of incoming information while having the ability to enable an internal attenuator for situations where adjacent channel interference is present.

SUMMARY OF THE INVENTION

Briefly, according to the invention, there is provided an apparatus and method for a radio frequency (RF) receiver which utilizes front-end preselecter tuning for improving intermodulation distortion (IMD). The invention utilizes preexisting preselecters within the receiver where they may be tuned to act as attenuators to an RF input signal. This enables the receiver to attenuate high input signal levels without the need to retrofit existing receivers or add external attenuation devices in situations where high amounts of input signal attenuation are required to prevent off-channel interference from preventing reception of on-channel information.

BRIEF DESCRIPTION OF THE DRAWINGS

The features of the present invention, which are believed to be novel, are set forth particularly in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
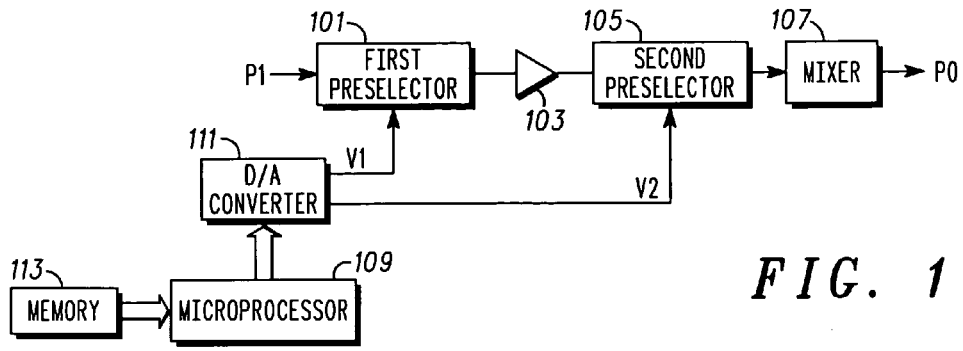
FIG. 1 is a block diagram showing operation- of the receiver amplifier stage with preselecter circuit working to provide attenuation in accordance with the preferred embodiment of the invention.

While the specification concludes with claims defining the features of the invention that are regarded as novel, it is believed the invention will be better understood from a consideration of the following description in conjunction with the drawing figures, in which like reference numerals are carried forward.

Referring now to FIG. 1, a block diagram illustrates an apparatus and method for a radio frequency (RF) receiver front-end pre-selector tuning having improved reduction in intermodulation distortion 100 includes a first preselecter 101 which receives an RF input signal. As is known in the art, a preselecter is essentially an RF filter that acts to reduce the magnitude of undesired signals such as image and one-half intermediate frequency (IF) interferers. Preferably the preselecter is tunable using one or more varactor circuits enabling the preselecter to be tuned using a direct current (DC) voltage. As shown in FIG. 1, the preselecter couples the incoming RF signal to the input of a low noise amplifier (LNA) 103 while a second preselecter couples the output of the LNA 103 to the input of mixer 107.

In order to tune, both the first preselecter 101 and the second preselecter 105, a microprocessor 109 is used in connection with a digital-to-analog converter (DAC) 111. The microprocessor is capable of providing one or more digital signals that are used by the DAC 111 to produce a series of precise DC voltages to control tuning of the preselecters. A memory 113 may be used in connection with the microprocessor 109 in order to recall certain criteria depending on the frequency or band settings of the receiver 100. This enables both the first preselecter 101 and second preselecter 105 to be tuned quickly in the event of varying signal conditions. Hence, voltages may be determined apriori and stored in memory 113. When IM is detected, the microprocessor 109 programs the DAC 111 to set the appropriate voltages depending on desired IM mode tuning methods and required attenuation levels.

There may be instances when high signal levels may be present at the input of the receiver 101. These high signal levels are typically the result of an on-channel transmitter in close proximity to the receiver. Alternatively, they may occur due to intermodulation interference (IM) that is generated by strong off-channel signals mixing with signal components of an on-channel signal to produce unwanted signal products that are within the passband of the receiver. One common method used to reduce these strong levels of intermodulation distortion (IMD) is to use an attenuator at the input of the receiver. One problem associated with many radio receivers is that they do not include an attenuator. Hence, in order to use this type of device for attenuation purposes the attenuator must be coupled outside the receiver as a separate unit or somehow integrated into the radio receiver circuitry.

The present invention utilizes an apparatus and method that enables one or more of the preselecters already used in the radio for tuning purposes, to be used as an attenuation device. This is accomplished by mistuning or detuning the preselecter so that it operates as an attenuator. For example, since the first preselecter 101 and second preselecter 105 are used to couple the input and output to the LNA 103, they can then be used to detune or attenuate the input and output of the LNA. This results in attenuation due to impedance mismatch. This method involves using one or more predetermined voltages generated by the microprocessor 109 and DAC 111.

As seen in FIG. 1, depending on the preferred detuning method, the voltage V1 controlling the first preselecter 101 and voltage V2 controlling the second preselecter 105 may be tuned together (V1=V2) or separately (V≠V2) to achieve a desired response. The latter method results in a wider attenuation bandwidth and more closely resembles the response of a discrete attenuator device. With either method, the amount of attenuation is selectable by proper adjustment of V1 and V2. In high signal conditions where a large degree of interference is present, the present invention provides a system and method where the preselecter can be used to attenuate the RF input signal reaching the mixer 107. This enables the receiver to demodulate and provide information to the user that is substantially free from high signal levels occurring on adjacent channels.

Figure 2:
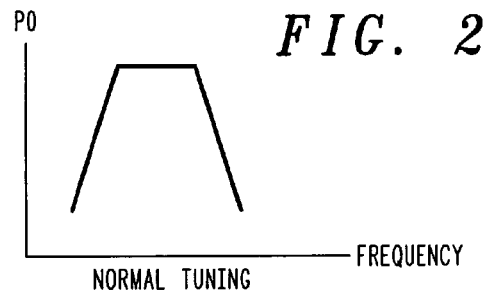
FIGS. 2, 3, and 4 are frequency response diagrams illustrating the result of a preselecter(s) being used as an attenuator in a receiver as used in the present invention.
Figure 3:
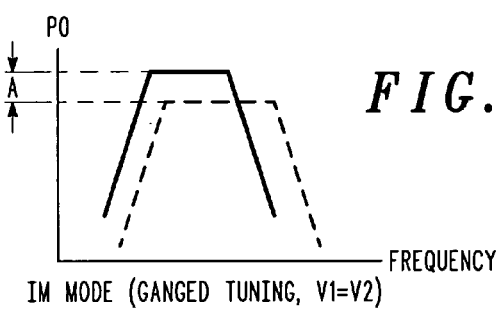
Figure 4:
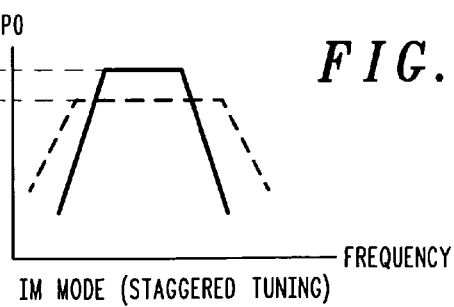

FIGS. 2, 3 and 4 illustrate a series of frequency plot diagrams. Each diagram shows an output (Po) from the mixer 107. FIG. 2 depicts a normal tuning response from the first preselecter's input to the mixer 107 while FIG. 3 shows the effect of detuning of the first preselecter 101 and second preselecter 105. In FIG. 3, it is evident that when the first preselecter 101 and second preselecter 105 are gang tuned and the change in control voltage is equal (V1=V2), not only is the amplitude of the output waveform decreased but the frequency response is also broadened.

FIG. 4 illustrates the situation where the first preselecter 101 and second preselecter 105 are tuned in a staggered fashion (V1≠V2). As in FIG. 3, not only is the amplitude of the output waveform (Po) attenuated but the frequency response can also be further broadened. Although both methods V1=V2 and V1≠V2 provide similar reductions in the level of attenuation i.e. signal magnitude reduction, the method V1≠V2 expands the attenuation bandwidth compared with the V1=V2 method. When using either detuning method, it is important to adjust the voltages such that the image performance degradation is minimized. This depends on whether the local oscillator (LO) injection as used in the receiver design is higher or lower than the receiver IF mixer stage. Thus, the improvement in IM distortion will be proportional to the amount of attenuation through detuning of the first preselecter 101 and second preselecter 105. As will be evident to those skilled in the art, the present invention has many useful applications where such broadband tuning is required since controllable degrees of attenuation may be required as used with amplifier circuits or a mixer output signal.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An amplifier stage used in a radio receiver comprising:
   at least one tunable preselector for accepting a radio frequency (RF) input signal within a passband of the receiver;
   at least one low noise amplifier (LNA) for amplifying the RF input signal; and
   wherein the at least one tunable preselector is selectively tuned with a control voltage to be offset such that the at least one tunable preselector acts as an attenuator providing substantially equal attenuation within the at least one tunable preselector's passband, to a plurality of input signals comprised of both desired, on-channel signals and off-channel signal interferers, sufficient to reduce on-channel intermodulation distortion created by off-channel interferers;
   wherein the at least one preselector includes a first preselector used at the input of the at least one LNA and a second preselector is used at the output of the at least one LNA;
   wherein the first preselector and second preselector are tuned through a digital-to-analog converter (DAC) with the same control voltage.

2. An amplifier gain stage as in claim 1, wherein attenuation is achieved through a mismatch in impedance.

3. An amplifier gain stage as in claim 1, wherein the at least one tunable preselector feeds the RF input signal to at least one mixer.

4. An amplifier gain stage as in claim 1, wherein the first preselector and second preselector are tuned through a digital-to-analog converter (DAC) with separate control voltages having different voltage values.

5. A method for tuning a radio receiver pre-selector comprising the steps of:
   detecting a high input signal level to the radio receiver;
   selectively controlling the at least one preselector circuit in the radio receiver so as to act as an attenuator to the high input signal level via impedance mismatching and providing an attenuated input signal having substantially equal attenuation across the at least one preselector's passband sufficient to reduce on-channel intermodulation interference created by adjacent channel interferers; and
   providing the attenuated input signal to at least one amplifier in the radio receiver;
   wherein the step of controlling further includes the step of: varying a control voltage to a first and second preselector so as to control the amplitude level of radio frequency (RF) signals used with at least one amplifier;
   wherein the control voltage is varied through the use of a microprocessor and digital-to-analog converter.

6. A method for tuning a radio receiver pre-selector tuned circuit as in claim 5, wherein the step of controlling further includes the step of:
   varying a control voltage to adjust the levels of gain and attenuation of the at least one preselector circuit.

7. A method for tuning a radio receiver comprising the steps of:
  providing at least one varactor tuned preselector to an amplifier stage in the receiver;
  detecting interference within the receiver passband; and
  selectively tuning the at least one preselector such that it provides substantially equal attenuation within the at least one preselector's passband, to a plurality of input signals comprised of both desired, on-channel signals and off-channel signal interferers, sufficient to reduce on-channel intermodulation distortion created by off-channel interferers;
  wherein the at least one preselector is comprised of a first varactor tuned preselector provided as an input to the amplifier stage and a second varactor tuned preselector provided as an output of the amplifier stage;
  wherein the second varactor tuned preselector provides an input to a mixer circuit;
  wherein the at least one varactor tuned preselector is controlled by a controller and digital-to-analog converter (DAC) provide precise control voltages.

8. A method for providing attenuation as in claim 7, further including the step of:
  attenuating the input signal using an impedance mismatch between the at least one varactor tuned preselector and amplifier stage.

9. A method for providing attenuation as in claim 7, wherein the DAC provides equal control voltages to both the first preselector and second preselector.

10. A method for providing attenuation as in claim 7, wherein the DAC provides differing control voltage values to both the first preselector and second preselector.

* * * * *